United States Patent
Löbig et al.

(10) Patent No.: US 7,730,168 B2
(45) Date of Patent: Jun. 1, 2010

(54) METHOD AND APPARATUS FOR ASSIGNING PACKET ADDRESSES TO A PLURALITY OF DEVICES

(75) Inventors: Norbert Löbig, Darmstadt (DE); Jürgen Tegeler, Penzberg (DE)

(73) Assignee: Nokia Siemens Networks GmbH & Co. KG., Munich (DE)

( * ) Notice: Subject to any disclaimer, the term of this patent is extended or adjusted under 35 U.S.C. 154(b) by 292 days.

(21) Appl. No.: 11/883,277

(22) PCT Filed: Jan. 4, 2006

(86) PCT No.: PCT/EP2006/050028
§ 371 (c)(1),
(2), (4) Date: Jul. 27, 2007

(87) PCT Pub. No.: WO2006/079574
PCT Pub. Date: Aug. 3, 2006

(65) Prior Publication Data
US 2008/0313314 A1    Dec. 18, 2008

(30) Foreign Application Priority Data
Jan. 28, 2005   (DE) ................ 10 2005 004 151

(51) Int. Cl.
*G06F 15/177* (2006.01)
(52) U.S. Cl. ......................................... 709/222
(58) Field of Classification Search ............... 709/222
See application file for complete search history.

(56) References Cited

U.S. PATENT DOCUMENTS

| | | | |
|---|---|---|---|
| 5,836,910 A * | 11/1998 | Duffy et al. ................. 604/65 |
| 6,212,582 B1 * | 4/2001 | Chong et al. ................ 710/57 |
| 6,219,697 B1 | 4/2001 | Lawande et al. |
| 2003/0048746 A1 | 3/2003 | Guess et al. |
| 2005/0086342 A1 * | 4/2005 | Burt et al. .................. 709/224 |
| 2005/0185595 A1 * | 8/2005 | Lee ........................ 370/252 |

OTHER PUBLICATIONS

C.C. Fan et al., "The raincore distributed session service for networking elements", Parallel and Distributed Processing Symposium, Proceedings 15th International San Francisco, CA, USA, Apr. 23-27, 2001, los Alamitos, CA, USA, IEEE Comput. Soc., US, Apr. 23, 2001, pp. 1673-1681, XP010544581.
Zhang Wensong, "Linux Virtual Server for Scalable Network Services", Paper, [Online] 2000, pp. 1-10, XP002372188, Ottawa Linux Symposium 2000, Retrieved from Internet: URL:http://www.linuxvirtualserver.org/ols/lvs.pdf>, Retreived from Internet on Mar. 15, 2006.
W. R. Ed Stevens, Stevens et al., "TCP/IP Illustrated, ARP: Address Resolution Protocol", TCP/IP Illustrated, vol. 1: The Protocols, Professional Computing Series, Reading, MA, Addison Wesley, US, vol. 1, 1994, pp. 53-68, XP002247360.

* cited by examiner

*Primary Examiner*—Wing F Chan
*Assistant Examiner*—Tesfay Yohannes
(74) *Attorney, Agent, or Firm*—Laurence A. Greenberg; Werner H. Stemer; Ralph E. Locher

(57) ABSTRACT

Means for preventing a split brain scenario during high availability requests by providing a communication link between a switching control device operating on the application level and the module operating on the protocol level are provided. Quitting of the correct physical address is shifted to the application level via the communication link.

14 Claims, 1 Drawing Sheet

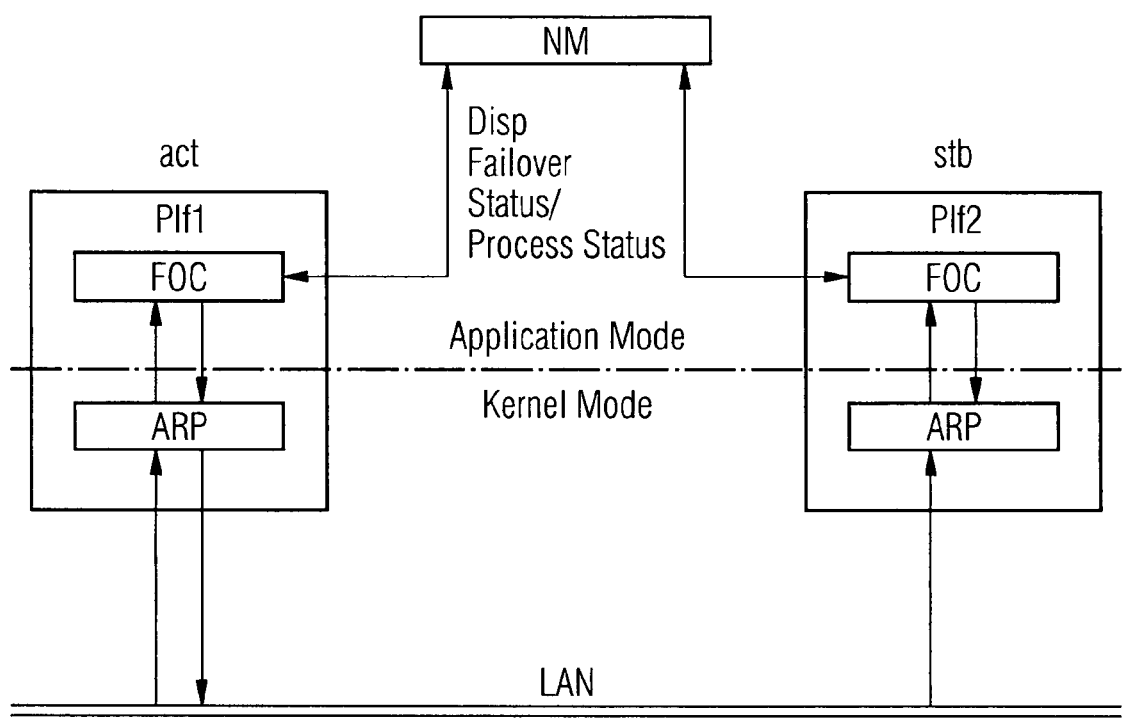

METHOD AND APPARATUS FOR ASSIGNING PACKET ADDRESSES TO A PLURALITY OF DEVICES

CROSS REFERENCE TO RELATED APPLICATIONS

This application is the US National Stage of International Application No. PCT/EP2006/050028, filed Jan. 4, 2006 and claims the benefit thereof. The International Application claims the benefits of German application No. 102005004151.5 DE filed Jan. 28, 2005, both of the applications are incorporated by reference herein in their entirety.

FIELD OF INVENTION

The present invention relates to a method and apparatus for assigning packet addresses to a plurality of devices.

BACKGROUND OF THE INVENTION

In the prior art, redundant resources are provided in reliable computer systems such as those used in communication systems. These may take the form for example of computer capacity, storage capacities or input/output capacities, the resource being provided by a platform or device. When a device fails, a redundant device immediately takes over the functions of the failed device so that, viewed from the outside, function and availability are only minimally impaired.

SUMMARY OF INVENTION

If a failed device that is to be replaced with regard to its function has packet-based interfaces via which it is in contact with other devices, then there are in principle two options for restoring operability:

In the first case, the substitute-switched device has its own packet address which is different from that of the failed device. In this case, all communication partners must be explicitly switched to this new packet address.

In the second case, the device taking over the function of the failed device has the capability to provide the packet address of the failed device. This has the advantage that, with regard to high-availability scenarios, no time delays and non-accessibilities arise that are avoidable. It also has the advantage of placing lower demands on communication partners who in this second case do not have to switch or be switched to a different packet address in failure scenarios. A prerequisite for this, however, is that the logical packet address which can be substitute-switched via a plurality of devices is resolved, i.e. assigned, clearly and reliably to the likewise packet-based physical address of the front-end network. This is necessary since the network has to address each of the devices using their own physical hardware address.

With regard to the example of an IP-based packet network, the logical packet address is configured as an IP address and the physical address as a globally unique MAC address of the Ethernet interface concerned. In order for the impairment of the function caused by the failure of the active device to be kept particularly low from the viewpoint of the IP network and remote communication partners, an "IP failover" function is executed. Here, a device that is redundant in relation to the failed device takes over both its function and its IP address. This means that the IP address of the failed device is transferred to a functional device with the same IP address. In addition to this, the device can have further IP addresses which are not IP failover addresses.

The IP failover function can be implemented such that the device taking over dispatches in relation to each of the IP addresses that it is taking over a message regarding address resolution (gratuitous ARP) to its local network and thereby transmits de facto a broadcast message into the network surrounding it.

All the receiving devices then update their address lists (ARP caches) by checking IP addresses located in their caches with regard to the address resolutions received (logical IP address to physical MAC address on the Ethernet), where applicable, enter the MAC address of the device taking over and, in doing so, overwrite the MAC address of the failed device. This is the prerequisite so that the remote partner systems communicating with the computer system over IP (Internet Protocol) do not notice the failure within the computer system at least at application level.

For the period between the failure of a device and its substitute-switching by the redundant device, messages which originate from external communication partners, in particular, are not able to be delivered successfully by the router front-ending the failed device. The same applies to further communication partners of the device in the same network (LAN). At latest upon expiration of the period of validity of the address resolution, a communication partner, e.g. the router, will want to resolve the failed IP address again. To do this, it generates an address resolution request (ARP request) to its network. The effect of this is that all the devices located in the network will receive the request as to whether they are responsible for a predetermined logical packet address and will optionally disclose this in the acknowledgement, indicating their physical MAC address in the network. If this is now carried out in the short period between failure and substitute-switching, then the IP address concerned will even drop out of the address list of the router, since no valid address resolution to a MAC address can be found. For highly reliable systems, it is therefore important to limit the period between start of the error and substitute-switching to a minimum.

Unfortunately, not all substitute-switching scenarios can be dealt with using this procedure. For example, it is known from commercial computer platforms that these can seize permanently at application level, i.e. individual application processes or parts of applications processes (threads) or possibly even all the application processes can no longer be started up. This does not, however, mean that communication with front-end routers or other communication partners in the network is also interrupted at IP level, such communication can under certain circumstances continue to be maintained. The monitoring of the computer platform now detects the failure and switches over, including IP failover addresses, to a redundantly provided device. With this, however, there are suddenly two devices in the network which, on request, will both resolve the logical IP failover packet addresses concerned to their own physical MAC address.

Consequently, it is left to chance whether a front-end router will, at the time of delivery of a message, address the failed device or the operable substitute-switched device. So if the ARP module (part of the IP stack) of the failed device can still respond to ARP requests and if due to other factors a substitute switch including IP failover has taken place, a serious and persistent communication fault and thus a functional loss of the device may result. If in this situation both devices receive an ARP request for an IP failover address for which a substitute switch has taken place, both will respond to it. If the failed device now transmits the ARP response by chance later than the operable substitute-switched device, all the communication partners and routers of the network will store the MAC address of the failed device as the MAC address associated with the IP failover address, provided they have already resolved this IP failover address currently to a MAC address, that is, communication with the said device already exists. The IP messages will thus continue to be sent to the failed device rather than the substitute-switched device which was supposed to take over the function of the failed device. In such a case, it cannot therefore be monitored which of the two devices receives the IP messages and the extent to which they are still processed. The risk that malfunctions or functional losses will occur, or that possibly even inconsistent data will be produced, is very large.

Such a scenario is also designated in the specialist literature a "split brain" scenario and must unconditionally be avoided in high-availability systems. In the prior art, a separate hardware unit is provided for handling this problem, said hardware unit monitoring the individual platforms of a redundancy unit (in general, of a redundancy pair) at IP level. This hardware unit ensures that an IP failover takes place only when the device or platform detected as having failed is also no longer transmitting/responding to any ARP requests. The problem with this solution is that the corresponding method requires a lot of effort and is comparatively slow (in adverse cases, in the range of a minute).

The object of the invention is to indicate a method and a device with the aid of which the occurrence and impact of "split brain" scenarios can be minimized.

This object is achieved on the basis of the features specified in the independent claims.

The advantage of the invention is to be seen in address handling at application level. The assessment of whether a platform is functional or will have to be substitute-switched by an IP failover function, is determined at application level by the function of the failover control on the basis of a plurality of environment criteria (environment parameters). An environment criterion or environment parameter can be the availability/non-availability of communication with the redundant device, the possibility of communication with other devices controlling the substitute-switching and the accessibility of central resources which are necessary for the proper processing of the tasks of the device. The failover control ensures that at any time the two redundant devices cannot, out of environment criteria assigned to a plurality of redundant devices, simultaneously be set to active mode i.e. to provision of IP failover addresses. According to the invention, the IP failover control has functions in each of the redundant devices with IP failover addresses and runs at application level as an application process or part thereof, which in each ARP request received from the ARP module is asked whether an ARP response must be sent. Thus, in principle, no unconditional ARP response takes place at a level below the application level. According to the invention the ARP request is made dependent on whether in particular a predetermined exchange of messages (handshake) can be carried out between ARP module and failover control at application level.

The handshake method recognizes easily, certainly and without doubt that even in the case of applications no longer executed no ARP requests may be responded to. In this way, a redundant device can, in accordance with control by the failover control, take over the IP failover addresses even in this case, without the failed device that is no longer functioning with regard to the application level disrupting the address switch on a level below the application level through unwanted ARP responses. A dependency is thus introduced between a failover control (FOC) in the user layer and the ARP module on the lower layer of the IP stack. This ensures that in any failure scenarios, the ARP module operates logically synchronously in relation to the status of the failover control, and it is capable of communicating the correct information in each case (transmitting/not transmitting messages relating to the IP failover address to this platform) to the network. External monitoring of the platform that extends beyond the failover control at application level, as is the case in the prior art, is therefore not necessary.

Advantageous developments of the invention are indicated in the subclaims.

Thus provision is also made to shorten the time windows for inadmissible cache content through freely running address resolution messages, which are additionally output from the application level following an ARP request or as a consequence of inconsistent address resolutions received (ARP request/response, gratuitous ARP).

In addition to this, hardware mechanisms can be used for resetting the device in a manner such that, as the first action of the automatic restart, the packet-based interfaces are deactivated in order to reduce further the time window for possible address conflicts after software problems.

Finally, a further advantage of the invention is to be seen in the fact that eavesdropping on the network for the purpose of issuing user alarms is carried out in the event of permanent inconsistency between the status of one of the redundant devices specified by the failover control and the address resolutions exchanged in the network.

Through a combination of all the mechanisms indicated herein-above, maximum functional availability is achieved.

BRIEF DISCRIPTION OF THE DRAWINGS

The invention will be explained in detail below with the aid of an exemplary embodiment represented in the drawings. Accordingly, the invention is described with the aid of two platforms (m=2) that are connected to a LAN.

DETAILED DESCRIPTION OF INVENTION

Environment parameters are to be understood here as status variables of the own system or of external systems, communication and protocol relationships and access to remote units such as databases. In the present exemplary embodiment, m=2 is to apply, which is not, however, in any way meant to be a restriction of the method with regard to a random number of devices. The devices are configured as (computer) platforms. A network management NM can also be provided in the network.

When operating fault-free, all the m=2 platforms are activated and all the processes are available. Each of the platforms Plf1, Plf2 has at least one packet-based interface and is capable of operating a plurality of failover addresses having a defined functionality. The two platforms consequently form a set of redundant devices with regard to the said failover addresses and the functionality to be provided for them.

One environment parameter is set at any time for just one of the two platforms and is not set for the remaining platform(s). According to the present exemplary embodiment, the environment parameter will be the operating states act/standby. If the environment parameter is set for one of the two platforms, then this platform will provide communication via the failover addresses and the desired processing function. If the environment criterion is not set for a platform, then this platform will not provide the failover addresses. The environment parameters are made available in the manner described by means of external control. For reasons of simplicity, a platform with an environment parameter that is set is designated hereinbelow as active (act) with regard to the failover addresses and a platform with no environment parameter that is set is designated as on standby (stb) with regard to the failover addresses. Here, the possibility is ruled out, in particular, that an environment parameter is permanently set to active for more than one platform. According to the FIGURE, there is on each of the two platforms Plf1, Plf2 an application process "Failover Control" FOC which has an interface to a module ARP of the platform and possesses the information as to whether the device is in "act" or "stb" status with regard to the failover addresses.

The status "act" means here that the platform is operating the failover addresses. A front-end router must transmit messages with these logical packet addresses to this platform. The ARP module of this device therefore responds to the associated address resolution requests (ARP requests). The status "stb", on the other hand, means that the platform is not operating the failover address. A front-end router must not transmit messages with these logical packet addresses to this device. The ARP module of this device does not therefore respond to the associated ARP requests.

The ARP module informs the failover control FOC that an ARP request has been received. An ARP request is acknowledged only if the failover control FOC of a device explicitly permits this. Thus, ARP requests are de facto not responded to autonomously via a low-level function of the IOP stack or of the operating system, but from the application level. A failure or seizure of the application level of the platform consequently results in the failover control FOC of this device no longer being available, so that ARP requests arriving subsequently are no longer responded to. ARP requests are not responded to when either the failover control FOC considers this correct or when communication of the ARP module with the failover control is disrupted. The failover control FOC does not respond to ARP requests in particular when the device is in stb status. A seizure at application level leads to the shutdown of the ARP handling of the device concerned.

This shifting, carried out within the platform, of the acknowledging of ARP requests at application level, i.e. from a user process of the platform, avoids the situation whereby the ARP function is still active even though the application level is no longer functional. (The latter could serve for substitute-switching the device, i.e. changing the environment parameter of the undisrupted redundant device to active.) If, nonetheless, the split brain effect should arise, then the impact is optionally restricted by the following action:

If a platform that is active with regard to the failover address receives an ARP request, then it responds to this ARP request, but assumes that other platforms could also claim the IP failover address in an unauthorized manner. As a precaution, it therefore transmits after a certain time interval following the acknowledgement of the ARP request at least one gratuitous ARP to resolve the sender address, for the sake of security. This is carried out on the initiative of the failover control from the application level of the device. In this way a wrongly existing ARP cache content of a communication partner on the network or of a front-end router can quickly be corrected, so that the time windows in which incorrect cache contents can exist are shortened drastically due to the split brain effect.

If ARP requests fail to materialize, then as a precaution a gratuitous ARP is generated cyclically at a certain minimum interval. This is also carried out on the initiative of the failover control from the application level of the device. An interface is also required in this case between failover control FOC at application level and the ARP module. Each ARP request is notified and leads additionally or alternatively to the gratuitous ARP being triggered from the application level and, where applicable, output in multiple form.

Such a procedure is always advantageous when the environment parameters can be inconsistent for short periods as a result of differing runtimes in the platforms involved. Thus if, for example as part of a routine or manual switchover, the activated platform is already active, whereas the platform to be deactivated has not yet been deactivated, and if in this time window an ARP request from a front-end router occurs, then both will respond. Where implementation is symmetrical, both will then also want to subsequently set a time-delayed gratuitous ARP. As a result of the time-shift, the change of the environmental criterion will with high probability reach the platform to be deactivated before the outputting of the additional gratuitous ARP, so that this will not be done by the platform to be deactivated and the possibly incorrect address resolution will be corrected by the activated platform.

In addition to this procedure, hardware monitoring of the platform can optionally be carried out at the application level. The result of this is that a seizure of the platform or of the failover control of this platform due to defective software or overloading can rapidly be detected and leads to the platform or of parts of the platform being restarted by hardware mechanisms, within the framework of which the packet-based interfaces are optionally also deactivated or reset as a first action. On startup of a platform that was formerly active for a packet address, the environment parameters will change such that one of the further platforms provided will take over the functions thereof and thus ensure uninterrupted availability of the functionality offered by the platform. Hardware monitoring requires the existence of corresponding hardware functions.

A further embodiment of the invention provides that a platform deactivates its IP failover addresses if it identifies the permanent loss of accessibility of the environment parameters. It proceeds in this case on the assumption that herewith the environment parameters of a further platform are configured such that said platform will henceforth service the IP failover addresses mentioned and thus no interaction of its own with regard to these failover addresses would lead to unwanted interruptions and malfunctions. The availability of resources (e.g. internal resources for processing or the uninterrupted communication with other external processing entities) are also incorporated within the environment parameter.

If platforms for the alternative servicing of a failover address are located in the same network, then each platform can, through eavesdropping in the network, receive the acknowledgements to ARP requests and the gratuitous ARPs of further platforms transmitted from the ARP module to the failover control FOC. The failover control to this end instructs the ARP module to deliver all ARP responses which are not transmitted as broadcast messages, and all ARP requests and gratuitous ARPs which are sent in broadcast mode and are used for address resolution to the failover control when the IP failover addresses serviced by the failover control FOC in the process encounter a different resolution from that to the own MAC address.

By this means, the failover control can optionally check the consistency of the contents with its own environment parameter. This means that it can in this way be established which further platform feels responsible for the failover address at any one time. The platform that is active with regard to the address can thus output for alarm purposes the physical address of a further platform that is accessing without authorization and bring out gratuitous ARPs for correction. A platform that is inactive with regard to the address or any other platform in the network can thus detect the platforms involved in a split brain situation and issue an alarm to the operator. A platform that is inactive with regard to the address can check its own environment parameter against the address resolution in the network for consistency and likewise issue an alarm to the user. Through the alarm and the operator intervention, which has to be seen as the last means, the duration of a possible address conflict is further shortened and the availability of the function made available is further increased.

The invention claimed is:

1. A method for assigning logical addresses to physical addresses of a plurality of devices which are operatively connected to one another, each device comprising an address resolution module, the method comprising:
    (a) receiving by a module of a device of said plurality of devices an address request message from a communication partner, the address request message comprising a logical address;
    providing a communication relationship between a switching control function operating at an application level and the module operating at a lower level than the application level; and
    acknowledging by the module the address request message in response of a permission by the switching control function, the address request message being acknowledged using a physical address of said device of said plurality of devices.

2. The method as claimed in claim 1, further comprising:
    providing a hardware monitoring of an availability of the application level of the devices or of an availability of the switching control function; and
    restarting at least a non-available portion of the device in response to detecting a failure by the hardware monitoring.

3. The method as claimed in claim 1, wherein one of the devices of said plurality of devices via eavesdropping in a network receives messages for assigning logical and physical addresses of the further devices of said plurality of devices, said messages being transmitted to the switching control function.

4. The method as claimed in claim 1, wherein the switching control function of the respective device uses one or a plurality of environment parameters to decide to respond to the address request message.

5. The method as claimed in claim 1, wherein after a predetermined time interval after the physical address has been acknowledged via the application level, at least one message initiated at the application level by the switching control function for assigning the physical address to the logical addresses is transmitted again to all communication partners in a free-running manner via the module.

6. The method as claimed in claim 5, further comprising:
    providing a hardware monitoring of an availability of the application level of the devices or of an availability of the switching control function; and
    restarting at least a non-available portion of the device in response to detecting a failure by the hardware monitoring.

7. The method as claimed in claim 6, wherein one of the devices of said plurality of devices via eavesdropping in a network receives messages for assigning logical and physical addresses of the further devices of said plurality of devices, said messages being transmitted to the switching control function.

8. The method as claimed in claim 1, wherein the switching control function of the respective device uses at least one environment parameter to decide to respond to the address request message.

9. The method as claimed in claim 8, wherein the logical addresses of at least one of the devices are deactivated in response to a permanent loss of accessibility of the used environment parameters.

10. The method as claimed in claim 9, wherein received address assignments are checked for plausibility against the environment parameters and an alarm with output of fault data is issued to an operator via a network management function.

11. The method as claimed in claim 1, wherein the logical address is configured as an IP failover address.

12. The method as claimed in claim 1, wherein the physical address is configured as a MAC address.

13. A device for switching between at least two redundant devices, comprising:
    a switching control device operating at application level;
    an address resolution module operating below the application level; and
    a communication relationship between the switching control device and the module such that an availability of logical addresses under a physical address of a device is made dependent on whether a message exchange is carried out between the switching control device and the module;
    wherein via the communication relationship the switching control device is informed by the address resolution module, that an address request message has been received in a device of said at least two devices, the address request message comprising a logical address; and
    wherein by the address resolution module the address request message is acknowledged in response of a permission by the switching control device, the address request message being acknowledged using a physical address of said device of said at least two devices.

14. The method as claimed in claim 1, further comprising:
    informing via the communication relationship the switching control function by the module, that the address request message has been received.

* * * * *